United States Patent [19]
Scott et al.

[11] Patent Number: 5,796,808
[45] Date of Patent: Aug. 18, 1998

[54] SYSTEM AND METHOD FOR AUTOMATICALLY SELECTING THE MODE OF COMMUNICATION BETWEEN A PLURALITY OF MODEMS

[75] Inventors: Robert Earl Scott, Indian Rocks Beach; E. Robert Lastinger, Jr., Lithia, both of Fla.

[73] Assignee: Paradyne Corporation, Largo, Fla.

[21] Appl. No.: 781,067

[22] Filed: Jan. 9, 1997

Related U.S. Application Data

[60] Provisional application No. 60/022,474, Jun. 21, 1996 and provisional application No. 60/026,970, Sep. 20, 1996.

[51] Int. Cl.$^6$ .................................................. H04M 11/00
[52] U.S. Cl. ............................. 379/93.31; 379/93.32; 379/93.34; 379/93.26; 375/222; 455/557
[58] Field of Search .................... 375/222; 379/93.01, 379/93.08, 93.26, 93.28, 93.31, 93.32, 93.34, 100.17, 1; 455/557, 414

[56] References Cited

U.S. PATENT DOCUMENTS

| | | | |
|---|---|---|---|
| 4,931,250 | 6/1990 | Greszczuk | 375/8 |
| 5,311,578 | 5/1994 | Bremer et al. | 379/93.32 |
| 5,528,679 | 6/1996 | Taarud | 379/93.01 |

*Primary Examiner*—Curtis Kuntz
*Assistant Examiner*—Stephen W. Palan
*Attorney, Agent, or Firm*—Thomas, Kayden, Horstemeyer & Risley

[57] ABSTRACT

A system is provided for automatically selecting the mode of communication between a plurality of multi-mode modems. A calling modem and an answering modem are disposed for intercommunication across an established communication link of a telephone network. The calling modem transmits a continuous calling signal across the established link, and the answering modem detects the calling signal and analyzes the calling signal to determine the configuration of the calling modem. In response, the answering modem generates and transmits an answering signal across the established link. The calling modem detects and analyzes the answering signal to determine the configuration of the answering modem. Finally, the system determines whether the established link passes through a PSTN, and if so, transmits a 2100 hertz tone across the established link. Otherwise, the system proceeds directly to the a modem training sequence.

20 Claims, 7 Drawing Sheets

Answer Modem -- Cellular

FIG. 6 Calling Modem -- Central Site

Answer Modem -- Central Site

SYSTEM AND METHOD FOR AUTOMATICALLY SELECTING THE MODE OF COMMUNICATION BETWEEN A PLURALITY OF MODEMS

The present application claims the benefit of U.S. Provisional patent application Ser. No. 60/022,474, filed Jun. 21, 1996. The present application further claims the benefit of U.S. Provisional patent application Ser. No. 60/026,970, filed Sep. 20, 1996.

FIELD OF THE INVENTION

The present invention generally relates to modem systems, and more particularly, to a system and method for automatically and rapidly establishing the mode of communication between two modems.

DISCUSSION OF THE RELATED ART

As is known, a variety of standards exist, which govern the protocol for communication between modems. For example, V.21, V.22, V.32, V.32bis, and V.34 are identifiers of differing communication modulation standards, just to name a few. Simply stated, communication standards govern how modems communicate information (voice and/or data) back and forth. With increased technology, more recent standards generally incorporate more sophistication and versatility than older standards.

For instance, the V.34 standard, which is intended for use on connections on general switched telephone networks and on point-to-point two-wire telephone type circuits, includes the following primary characteristics: (1) full and half-duplex modes of operation; (2) echo cancellation techniques for channel separation; (3) quadrature amplitude modulation for each channel with synchronous line transmission at selectable symbol rates; (4) synchronous primary channel data signaling rates ranging from 2,400 bits per second to 33,600 bits per second, in 2,400 bit-per-second increments; (5) trellis coding for all data signaling rates; and (6) exchange of rate sequences during start-up to establish the data signaling rate. The features of the V.34 standard are documented in the publicly-available V.34 specification and well known by those skilled in the art, and will not be described in detail herein.

Another significant feature of the V.34 standard, as it relates to the present invention, is the ability to automode to other V.-series modems that are supported by the V.32bis Automode procedures. In this regard, the V.34 modulation standard defines signal handshaking that two connecting modems exchange at startup in order to learn the capabilities of the other modem to most efficiently exchange information.

While the V.34 modulation achieves efficient and generally high speed communication between two communicating modems, it nevertheless possesses several shortcomings that impede even more efficient operation. One such shortcoming relates to its universal, but fixed configuration. While the V.34 modulation standard is "intelligent" enough to identify and adapt its communication-to-communication protocols of other modems, its operation is fixed in relation to its operating environment. That is, a modem operating pursuant to the V.34 modulation operates in the same fashion regardless of whether it is communicating via cellular link, through a two-wire or four-wire PSTN (Public Switched Telephone Network) network, through a leased line, a T1, etc. It is recognized, however, that certain "overhead" associated with the communication through some of these mediums is not needed when communicating through other mediums. For example, when communicating through a PSTN network, an initial two second connection period is required before information can be exchanged between the communicating modems. As is known, this two second delay is a requirement imposed by the FCC (Federal Communication Commission) for billing purposes—in early telephone systems, customer billing did not occur during the first two seconds after the connection was established. As a result, systems generally delay the transmission of information for a period of two seconds after the initial connection is established. Generally, when transmitting through a PSTN, this delay is accomplished by inherent delay in the startup between two modems.

Other shortcomings in, not only the V.34 modulation standard, but other contemporary modem systems relate to the initial transmission from the calling modem to the answering modem. Presently, calling modems transmit the calling signal through a tone cadence, where a calling tone is transmitted for a period of time (typically, 0.5 to 0.7 seconds in length), then the transmitter is turned off, while the calling modem "listens" for a response from the answering modem. As is known, this cadence in the calling signal originated from older systems which employed echo suppressers. The initial startup sequence in systems employing echo suppressers is half-duplex. Therefore, the calling modem has to stop transmitting the calling signal in order to "listen" for and receive the answer signal. Although echo suppressers have been replaced by echo cancellers (which permit full-duplex startup) in virtually all modern systems, modems still transmit the calling signal in cadence form. As a result, if the answering modem makes use of the calling signal, the average time required for the calling and answering modems to signal their initial connection is unduly lengthy.

Another significant shortcoming associated with the lengthy startup sequence, and one which served as a motivation in developing the present invention, relates to reliability. It has been found that, particularly over a cellular link the long data exchange sequence that occurs at startup results in higher incidents of failure and thus compromises reliability.

In summary, while multi-mode modem communication systems are known, these systems fail to recognize the communication environment or configuration, and therefore fail to achieve a dynamic, time-efficient, and reliable startup.

SUMMARY OF THE INVENTION

Accordingly, a primary object of the present invention is to provide an improved multi-mode modem for use in a modem communication system.

A more specific object of the present invention is to provide a multi-mode modem that provides a protocol for faster and more efficient startup operation based upon the system configuration and the path of the established communication link. Another object of the present invention is to provide a multi-mode modem that is capable of determining whether the established communication link with a remote modem does not pass through a PSTN and dynamically alter its startup sequence in such cases to achieve a more time-efficient startup sequence.

Still another object of the present invention is to provide a multi-mode modem that has improved reliability over multi-mode modems in the prior art.

Yet another object of the present invention is to provide a multi-mode modem that achieves a faster startup exchange than multi-mode modems in the prior art.

Additional objects, advantages, and other novel features of the invention will be set forth in part in the description that follows and in part will become apparent to those skilled in the art upon examination of the following description or may be learned via the practice of the invention. Furthermore, the objects and advantages of the invention are realized and obtained by means of the instrumentalities and combinations particularly pointed out in the appended claims. To achieve the foregoing and other objects, the present invention is generally directed to a system for automatically selecting the mode of communication between a plurality of modems. In accordance with one aspect of the invention, a calling modem and an answering modem are disposed for intercommunication across an established communication link of a telephone network. The calling modem includes calling signal means for generating and transmitting a continuous calling signal across the established link, and the answering modem includes detecting means for detecting the calling signal. The answering modem further includes analyzing means for analyzing the detected calling signal to determine the configuration of the calling modem, and means for generating and transmitting an answering signal across the established link. Similarly, the calling modem includes detecting means for detecting the answering signal, and analyzing means for analyzing the detected answering signal to determine the configuration of the answering modem. Finally, the system includes determining means for determining whether the established link passes through a PSTN, and means responsive to the determining means for transmitting a 2100 hertz tone across the established link only if the established link passes through a PSTN. In a preferred embodiment, the configuration of both the calling and the answering modems is determined by configuration settings that may be adjustably established during modem installation into the system. For example, the configuration settings may be as simple as hardwired set of DIP (Dual In-line Package) switches. Alternatively, a programmable memory such as an EEPROM (Electrically Erasable Read Only Memory) may be programmed during installation to contain the configuration settings. In this regard, the configuration information, among other information, may contain connection information. For example, whether the modem is connected to a cellular phone and thus to a cellular network switch, or alternatively whether the modem is connected via a two-wire connection, four-wire connection, T1 line, or otherwise connected through a PSTN. The configuration settings may also contain information regarding the one or more modulation protocols in which the modem is capable of transmitting.

Another aspect of the present invention relates to a method for automatically establishing the mode of communication between modems. More specifically, several aspects of the present invention are directed to efficiently and automatically establishing a mode of communication between a calling modem and an answering modem in a networked system having an established communication link between multi-mode modems. One such aspect relates to the establishment of the initial communication between the modems by transmitting a continuous calling tone. Transmitting continuous calling tone reduces the average time required for the modems to exchange their initial connect information. Another aspect relates to the ability of the modems, particularly the calling modem, to determine whether the established communication link passes through a PSTN. If the established link does not pass through a PSTN, then the initial two second delay required by the FCC may be avoided, providing for a faster startup.

DESCRIPTION OF THE DRAWINGS

The accompanying drawings incorporated in and forming a part of the specification, illustrate several aspects of the present invention, and together with the description serve to explain the principles of the invention. In the drawings.

Figure 1:
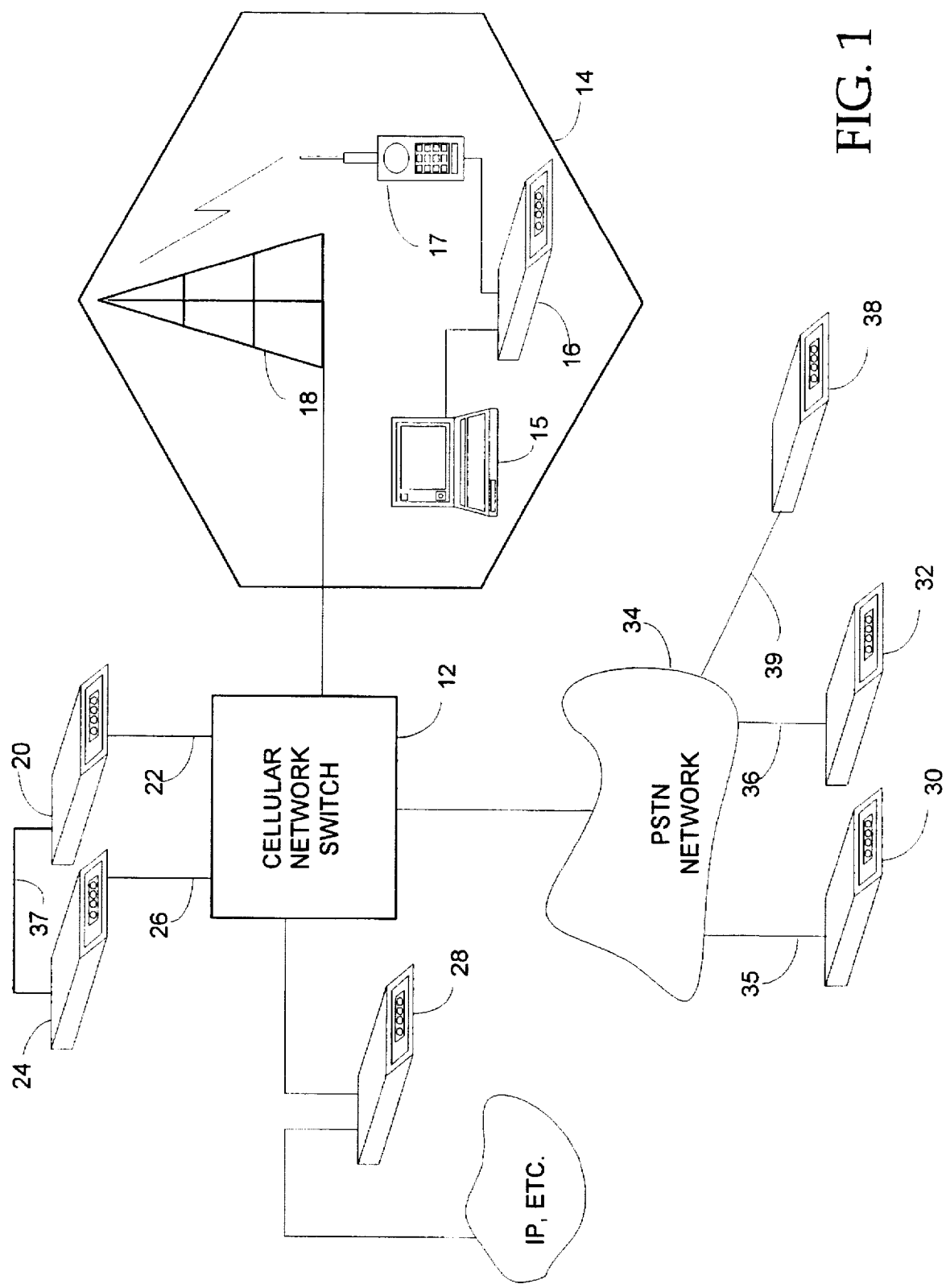
FIG. 1 is a system diagram, illustrating a multi-modem system wherein a plurality of modems are interconnected among a plurality of communication links.

Reference will now be made in detail to the description of the invention as illustrated in the drawings. While the invention will be described in connection with these drawings, there is no intent to limit it to the particular embodiment or embodiments disclosed therein. On the contrary, the intent is to cover all alternatives, modifications, and equivalents included within the spirit and scope of the invention, as defined by the appended claims.

DETAILED DESCRIPTION OF THE PREFERRED EMBODIMENT

Turning now to the drawings, FIG. 1 shows a system diagram of a system having multiple modems intercommunicating through a variety of mediums, including cellular and PSTN. Indeed, as previously mentioned, a driving factor in the development of the present invention was to design a system that provided improved reliability in data communication over a cellular link. This goal has been achieved by providing a more robust startup sequence for modem communication. Thus, FIG. 1 illustrates a multiple-modem system centered around a cellular network switch 12.

As illustrated, a cellular modem system 14 may be disposed for communication with the cellular network switch 12. More specifically, a portable computer 15 may be connected via cellular modem 16 to a cellular phone 17, which in turn communicates wirelessly with a cell tower 18 that communicates with the cellular switched network 12. It is appreciated that the modem 16 recognizes that it is on the cellular side via a strap or configuration setting, or alternatively, by a direct connect sensing of the cellular phone. Therefore, and as will be discussed in more detail below, the modem 16 will know that it is capable of communicating in accordance with the modulation standard of the present invention.

The cellular network switch 12 is also connected to a modem pool, including modems 20 and 24. The modems 20 and 24 are illustrated as connected in back-to-back configuration and communicating to the cellular network switch 12 over links 22 and 26. As will be appreciated and discussed below, the links 22 and 26 will support different communication protocols, or different modulation standards.

By way of definition, a "central-site" modem is one that is capable of supporting the modulation standard of the present invention and is not connected to a cellular phone. In this regard, all central-site modems are connected via a four-wire connection. Examples which are illustrated in FIG. 1 include an MSC (Cellular) modem 20, an MSC (PSTN) modem 24, an MSC (Single-ended) modem 28, and a PSTN (ETC2) modem 30—where an MSC modem is one that is connected at a Mobile Switching Center. A significance of the distinction among these various types of modems relates to the startup sequence, which will differ slightly depending upon the type of central-site modem. Preferably, a hardware identifier, such as a DIP switch or a firmware option configurable at modem installation, defines the type of modem for purposes of the startup sequence.

In keeping with the description of FIG. 1, modem 20 is illustrated as an MSC (Cellular) modem that is connected in a back-to-back mode with modem 24, an MSC (PSTN) modem. Modem 20, therefore, is designed to support the ETC2 modulation protocol of the present invention and simulate a cellular modem during the initial modem startup routine. Modem 28 is an MSC (Single-ended) modem that, although it may communicate with modems on the PSTN 34, will typically communicate only with cellular modems. Indeed, when communicating with cellular modems the 2100 Hertz tone, which is typically inserted to disable echo cancellers, is preferably omitted. Advantageously, elimination of this tone achieves a faster and more desirable modem startup.

A PSTN (ETC2) modem 30 and a standard PSTN modem are connected via PSTN 34 to the cellular network switch 12. The modem 30 is connected to the PSTN 34 via a four-wire connection 35 and modem 32 via a two-wire connection 36. Consistent with the concepts and teachings of the present invention, the four-wire connection 35 facilitates the communication of modem 30 with a cellular modem 16, for example, in the ETC2 modulation standard of the present invention. However, as will be appreciated by those of ordinary skill in the art, merely ensuring a four-wire connection 35 alone will not ensure proper system operation in accordance with the present invention. In this regard, such a four-wire connection 35 may nevertheless pass through a two-wire connection, and thus a hybrid converter circuit, at the central office. In this event, echo will be injected into the signal and the abbreviated modulation standard of the present invention may be compromised. There are, however, steps that may be taken to ensure proper operation of the invention. These include, for example: (1) ordering a Direct Inward Dial connection and instructing the phone company to avoid a two-wire connection for that setup; (2) obtain a direct T1 to the Interexchange Carrier (for example, a "1-800" number); and obtaining an ISDN PRI connection, as it will always support four-wire for both call origination and call answer.

By way of illustration, consider a call originated by the computer 15 and cellular modem 16 to the standard PSTN modem 32. The established communication link will pass through the cellular phone 17 to the cell tower 18, through the cellular network switch 12, across link 22 to the MSC (Cellular) modem 20, and to the connected modem 24 via RS-232 connection 37, across link 26, and back through the cellular network switch 12 to the PSTN 34, and ultimately across the two-wire link 36 to modem 32. As will become clear from the description that follows, the cellular modem 16 and the MSC (Cellular) modem 20 will connect and startup in accordance with the communication protocol of the present invention. However, since the established communication link that passes from modem 24 to modem 32 passes through a PSTN 34 and a hybrid converter, then the communication protocol of the present invention will not be adequately supported. Accordingly, and in accordance with the invention, the modems 24 and 32 will identify this situation and will connect and communicate using an alternative communication protocol supported by both modems and capable of effective transmission across the established link. In this regard, the overall communication link does not realize the fast startup provided by the present invention, but the protocol of the present invention ensures that the link between modems 16 and 20 achieves maximum speed and reliability.

Indeed, a primary feature of the present invention is for connecting modems to determine whether they are both compatible, in terms of communication protocol, and whether they are connected through a line that passes through a PSTN. If the modems are compatible and the established communication link is outside a PSTN (e.g., cellular to MSC), or is to a PSTN modem with a 4-wire connection that has been configured for supporting this invention, then the modems may connect and begin their startup sequence in accordance with the present invention. In this regard, the communication protocol of the present invention is designed to be fast as well as robust and is accomplished by the use of simple tones. The use of such simple tones facilitates the implementation of the automatic mode select to be in a modem's control processor rather than the digital signal processor (DSP) chip.

In addition to the preferred communication protocol of the present invention, which will be discussed in more detail below, the preferred embodiment also includes several "fallback" modulations. More particularly, the modem of the present invention preferably includes ETC1, V.34, V.32bis, V.32, and V.22bis modulations. Thus, in the previous example, modems 24 and 32 may communicate using one of these communication protocols. These modulation protocols are documented, will be understood by persons of ordinary skill in the art, and will not be discussed herein. Suffice it to say, supporting the above-listed modulation standards greatly enhances the flexibility and versatility of modems constructed in accordance with the present invention.

Figure 2:
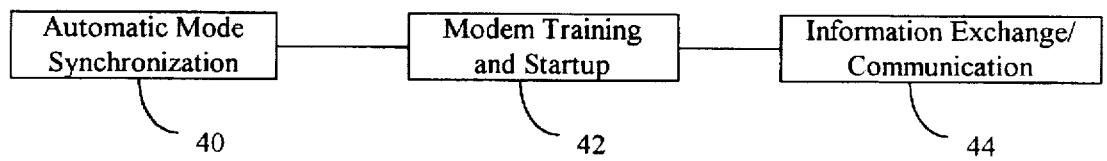
FIG. 2 is a block diagram illustrating the primary handshaking and data exchange sequences between a calling and an answer modem.
Figure 3:
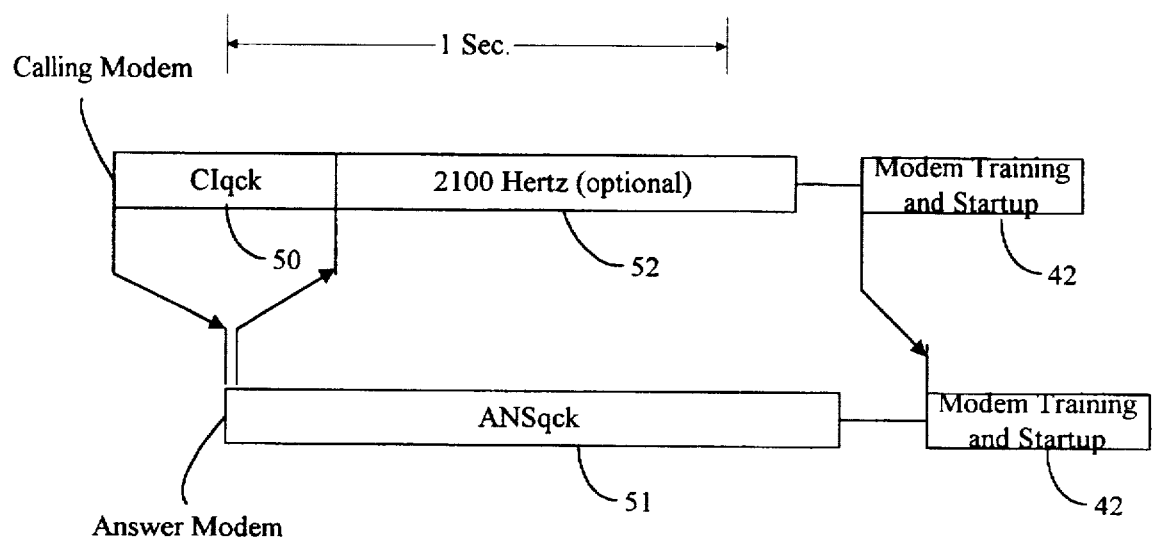
FIG. 3 is a schematic diagram similar to FIG. 2, illustrating the signal exchange during the automatic mode synchronization sequence of FIG. 2.

To more particularly describe the initial startup sequence in accordance with the modulation standard of the present invention, reference is made to FIGS. 2 and 3. FIG. 2 illustrates the three principal components of modem exchange or communication. After the cellular modem initiates the call, such that a communication link is established, the modems enter a mode select operation 40. During this period, the modems exchange parameters that identify the modems and thus their communication protocol. This operation 40, thus, synchronizes the modems for communication in accordance with the same standard or protocol, such as ETC2-QC, V.34, V.22, V.22bis, etc.

Once the modems have synchronized their communication protocol, or modulation standard, then they enter a training and startup sequence 42. In a manner known in the art, during this sequence the modems may test the established communication link for noise, bandwidth, etc. in order to determine an appropriate rate for communication. The modems may also operate during this period to train their internal echo cancellers by, for example, ranging the established link of communication. In accordance with a related aspect of the present invention, under certain circumstances the modem training and startup sequence may be significantly shortened to provide a more robust (both time-shortened and reliable) startup sequence. More particularly, the "circumstances" which provide such a robust startup include communicating modems constructed in accordance with the invention detecting an established link of communication that does not pass through any two-wire connections.

After the modem training and startup sequence 42 has completed, the communicating modems enter the information exchange/communication sequence 44. During this sequence, the modems have exchanged operational and definitional parameters and are communicating data back and forth. Error correction, dynamic autorating, and other similar features, whether known in the prior art or newly developed, may be employed consistent with the concepts and teachings of the present invention.

Referring now to FIG. 3, the initial automatic mode synchronization 40, executed in accordance with the preferred embodiment, is illustrated. As shown, this sequence is executed by exchanging signals between the calling modem and the answer modem. After the calling modem transmits the dial tones to establish a communication link with the answer modem, it transmits the calling signal "CIqck" 50. As will be described in more detail in connection with the flowcharts of FIGS. 4–7, this signal may, in accordance with the invention, comprise a 1900 hertz tone, or alternatively, may comprise a 1500 hertz tone modulated with a 1900 hertz tone. If only a 1900 hertz tone is transmitted as CIqck, then the answer modem knows that the calling modem is configured as a central-site, four-wire modem (See FIG. 6). Alternatively, if the CIqck signal includes both 1500 and 1900 hertz components, then the answer modem knows that the calling modem is configured as a cellular modem.

As will be appreciated by those of ordinary skill in the art other calling signals may be transmitted by the calling modem. For example, calling signals consistent with that of a facsimile transmission, or calling signals consistent with other modem modulation standards, such as V.34, V32, V32bis, etc. may be transmitted. Since automatic connection and synchronization to facsimile devices and these other modulation standards is well known it will not be discussed herein. Indeed, the significance of the present invention is achieved when both the calling modem and the answer modem are capable of communicating in accordance with the modulation protocol herein described.

Once the CIqck signal is received by the answer modem, then the answer modem transmits its response back to the calling modem. The purpose of this answer signal is not only to signal receipt of the calling signal, but also to uniquely identify the answer modem. Again, as is known in the art, this answer signal may comprise ANS or ANSam signals, as are known by the V.34 and V.22 communication protocols. If so, then the calling modem will then startup and train 42 and communicate 44 in accordance with the appropriate modulation standard. Significant to the present invention, however, is when the answer signal is ANSqck, which is defined by either a 1680 hertz tone or an 800 hertz tone.

Figure 4:
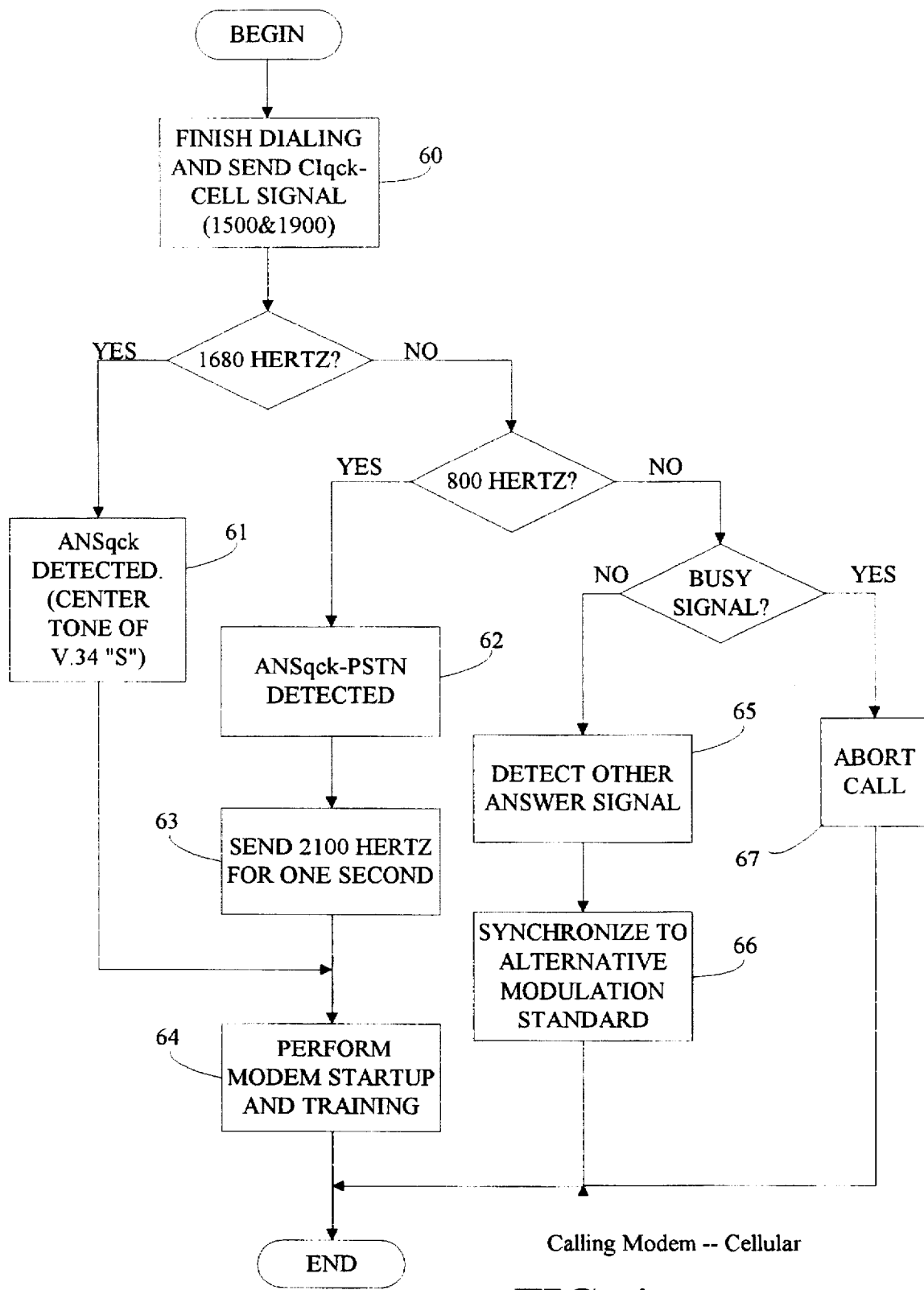
FIG. 4 is a software flowchart illustrating the architecture and operation of the present invention when the calling modem is a cellular modem.

As illustrated in FIG. 4 (assuming the calling modem is a cellular modem), if ANSqck is an 800 hertz tone, then the calling modem knows that the answer modem is configured as a four-wire connection and can communicate with the calling modem in accordance with the communication protocol of the present invention. In addition, the 800 hertz ANSqck signals the calling modem that the answer modem is connected to a PSTN 34 (see FIG. 1). Therefore, the calling modem transmits a 2100 hertz tone for approximately one second. This, as is known, serves to pad, or occupy, the initial two second connect period, as required by the FCC for billing purposes. Furthermore, it serves to disable the echo cancellers within the PSTN 34.

If ANSqck is a 1680 hertz tone, which is the center tone of V.34 "S", then the calling modem knows that the answer modem is configured as a four-wire connection and can again communicate with the calling modem in accordance with the communication protocol of the present invention. More significantly, it tells the cellular calling modem that the answer modem is not connected to a PSTN 34. Therefore, both the calling modem and the answer modem can determine that the established communication link is entirely outside the PSTN 34. Accordingly, the FCC billing delay need not be inserted. Furthermore, certain assumptions may be made in regard to bandwidth, or transmission quality. For example, the established communication link will not pass through echo cancellers, and as a result, the calling modem need not transmit the 2100 hertz tone. Instead, upon receiving the ANSqck answer signal, the calling modem may immediately enter the modem training and startup sequence 42.

As will be further appreciated by those of ordinary skill in the art, by making certain assumptions regarding the line quality of the established link, the modem training and startup sequence may be shortened. For example, in the preferred embodiment, the system initiates communication by assuming a 9600 baud rate. It has been found that most cellular connections may transmit at this rate, and certain front-end savings may be realized by defaulting to this initial startup rate. Of course, this rate may be increased, or autorated upwardly, in accordance with methods known in the prior art, after the initial startup and training sequence 42 has been completed.

Referring now to FIG. 4, a top-level flowchart is shown, illustrating the automatic modes synchronization of a cellular calling modem constructed in accordance with present invention. Once the calling modem has completed transmitting the dialing sequence, it transmit the CIqck which for a cellular calling modem includes modulated 1500 and 1900 hz tones (step 60). Once the calling signal has been transmitted, the calling modem will wait to receive the answer signal from the answer modem. In order to exchange data using the modified modulation standard of the present invention, the calling modem looks to receive one of two answer signals. The first valid answer signal as in 1680 hz tone, which is the center tone of the V.34 "S" signal (step 61). This tone signals to the calling modem that the answer modem is not only compatible to transmits in the modified modulation standard to the present invention, but further indicates that the answer modem is connected via four wire connections, and does not interconnected to a PSTN. Accordingly, since the calling modem is a cellular modem, then the established communication link does not pass through a PSTN and the initial two second FCC-required delay need not be inserted into the start-up sequence. Moreover, since the entire communication link is four wire, then the modems need not transmit the 2100 hz signal to disable echo cancellor.

A second valid answer signal is an 800 hz tone, which also indicates that the answer modem is connected via four wire and therefore can communication in accordance with the modified modulation standard of the present invention. In addition, the 800 hz tone indicates that the answer modem is connected to a PSTN, (see step 62). Assuming, as previously discussed, that the requisite steps have been taken to ensure that the established communication link does not pass through a two wire connection, then certain savings or efficiencies can be gained during the modem start-up and training sequences (e.g., eliminate echo training since no hybrid circuits are present in the communication link). Nevertheless, the FCC-required delay is inserted and, therefore, a 2100 hz tone is transmitted at step 63 by the calling modem for a duration of approximately one second. The amount of the 2100 hz tone will "pad" the total modem automode and startup time to two seconds. This assures that no customer data is transferred in the first two seconds (which meets FCC requirements.). Thereafter, calling modem proceeds with the modem training and start-up sequence (step 64).

If neither of the foregoing answer signals are received, then the system operates to determine whether another valid answer signal has been transmitted from the answer modem. Step 65 broadly designates this function. It should be appreciated that well known answer signals, such as ANS or ANSam, may be transmitted by the answer modem and, if received, the calling modem may synchronize to the appropriate modulation standard (step 66). Although not separately designated in FIG. 4, it should be further appreciated that if no valid answer signal is received by the calling modem within a given period of time, then the calling modem will time out and abort the attempted communication. Also, and as illustrated at step 67, the calling modem will abort the attempted communication if a busy signal is received.

Figure 5:
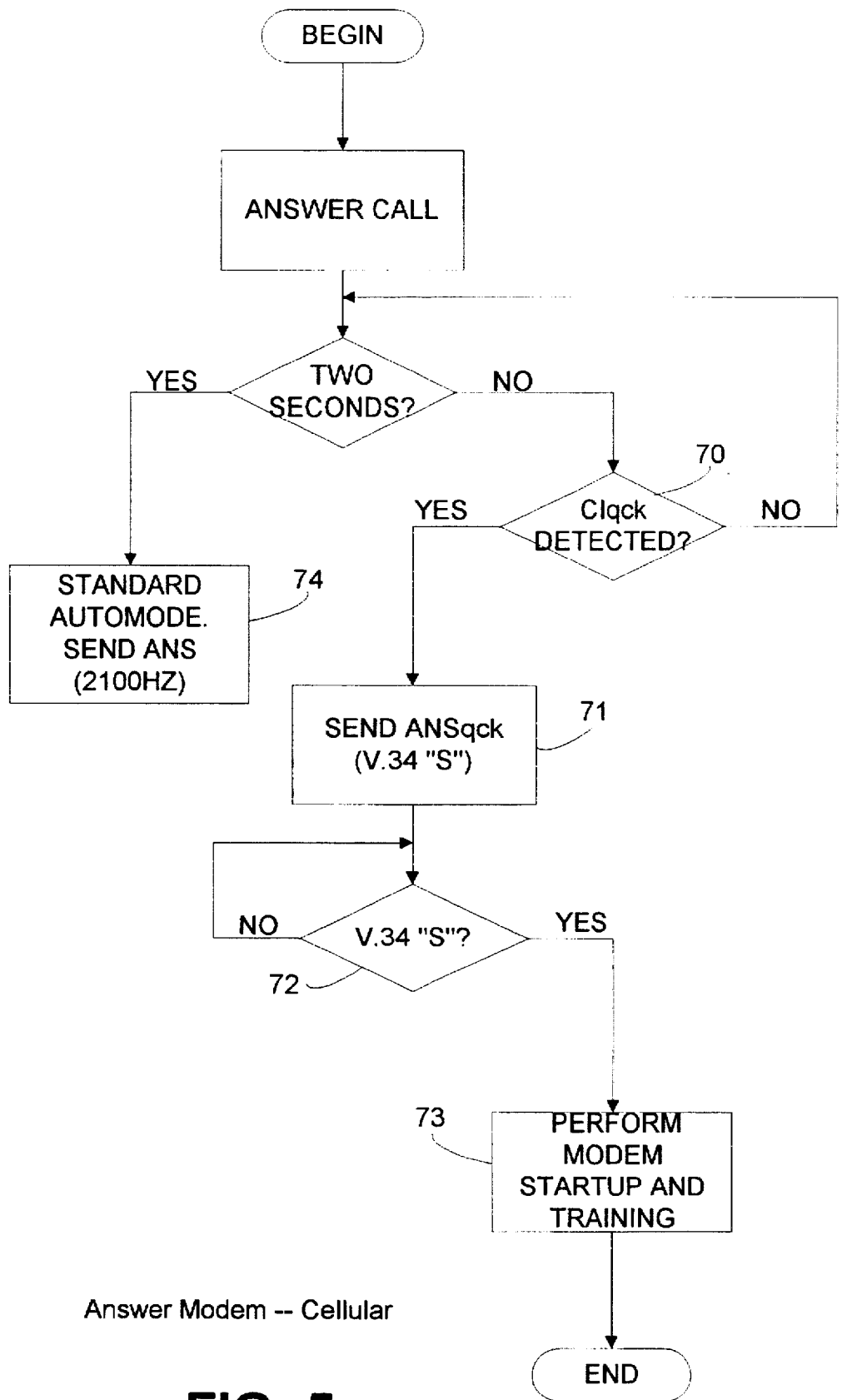
FIG. 5 is a software flowchart illustrating the architecture and operation of the present invention when the answering modem is a cellular modem.

FIG. 5 shows a top-level flowchart illustrating the architecture of the software for, and the operation of, a cellular answer modem constructed in accordance with the present invention. Once the communication link has been established and a call has been initiated, the answer modem looks to detect the ClQck calling signal (step 70). In the presently preferred embodiment, cellular to cellular modem communications are not supported. Therefore, a cellular answer modem will assume that a calling modem transmitted a ClQck signal will transmit only a 1900 hz tone, rather than the modulated 1500 and 1900 hz tones. Having said this, it should be appreciated that with certain designed implications that cellular-to-cellular communications could be supported and thus are within the scope of the present invention.

In keeping with the description of FIG. 5, once the answer modem has received the ClQck calling signal, it transmits the ANSqck answer signal (step 71). It then waits for the calling modem to enter the modem start-up and training sequence. This sequence is identified by receiving the "S" signal as assigned by the V.34 modulation standard (step 72). Once this signal is received, then the answer modem will transmit back to the calling modem the appropriate "S" signal.

Alternatively, if the answer modem, within a period of two seconds, has not received ClQck calling signal then it will proceed with the start-up sequence in accordance with an alternative modulation standard. This, therefore, assumes that the modified communication protocol of the present invention is not supported by the calling modem, and the answer modem will typically respond to the calling signal of an alternative communication signal by transmitting a 2100 hz tone (step 74).

Figure 6:
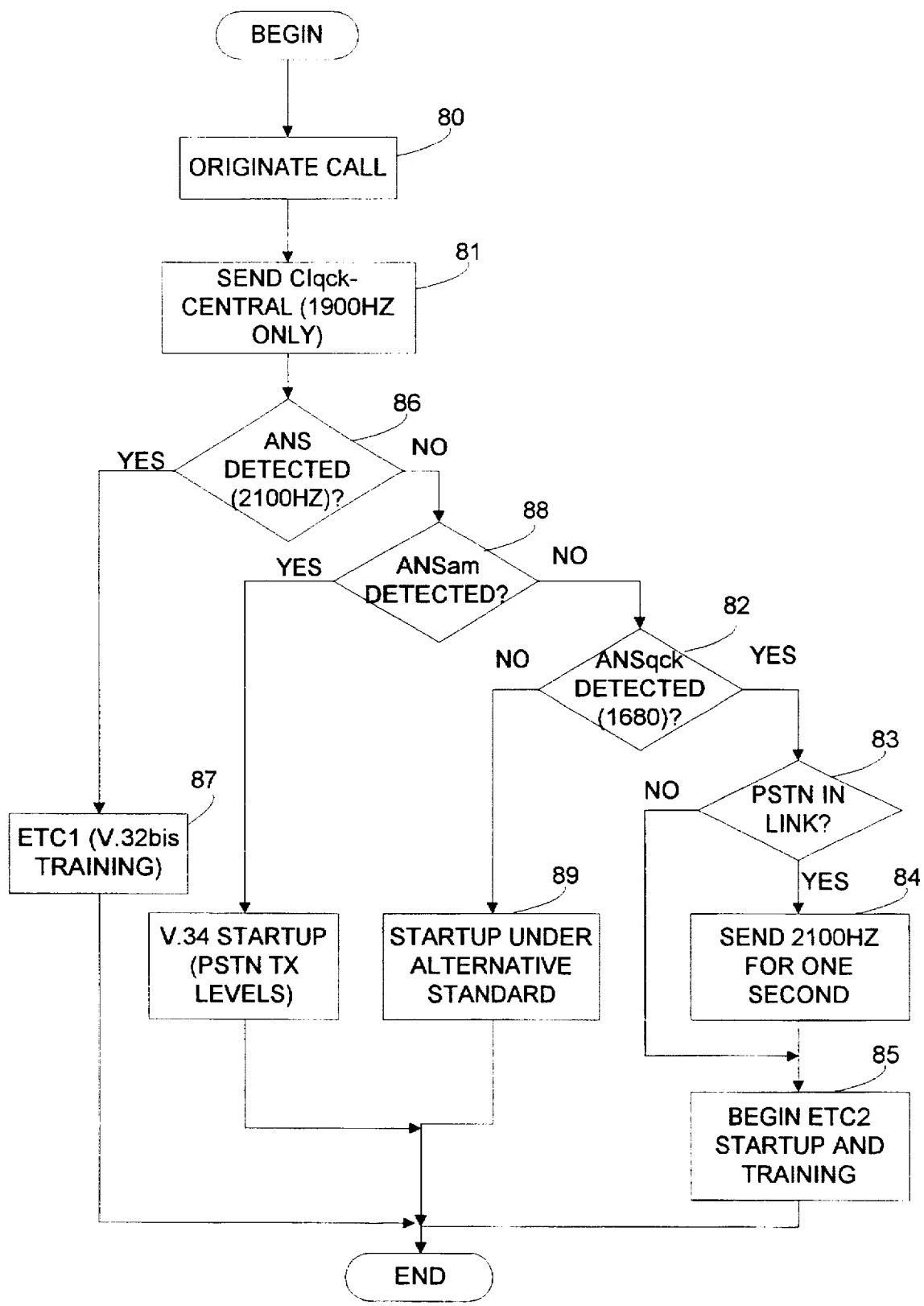
FIG. 6 is a software flowchart illustrating the architecture and operation of the present invention when the calling modem is a central-site modem.

Referring now to FIG. 6, a software flowchart illustrating the top-level software architecture and operation of a central site calling modem is shown. As depicted, the calling modem originates the call and establishes a communication link at step 80. Once the communication link is established, the calling modem transmits the ClQck calling signal, which in the case of a central site calling modem comprises a 1900 hz signal tone (step 81). If the 1680 hz ANSqck answer signal is detected (step 82), then the calling modem recognizes the answer modem as one capable of transmitting pursuant to the modified communication protocol of the present invention. Thereafter, the calling modem determines the network configuration of the established communication link (step 83). That is, the central site calling modem will determine whether the established communication link passes through a PSTN or not. If it is determined that the established link passes through a PSTN, then, as in the case of the cellular calling modem, the calling modem transmits a 2100 hz signal for approximately one second (step 84). Thereafter, the calling modem enters the modem start-up and training sequence (step 85).

Alternatively, if the calling modern detects the ANS answer signal (2100 hz) (step 86), it communicates with the answer modem using the ETC 1 communication protocol and the V.32bis training (step 87). If the ANSam answer signal is detected (step 88), the modem will startup in standard V.34 mode, which is well known in the art and therefore not described herein. The modem will also monitor for ANSqck (step 82), which in this example is a 1680 Hz tone. If this is not detected, then the modem will startup under an alternate low speed standard (step 89), which is well known in the art and therefore not described herein. If ANSqck is detected, the modem will operate differently depending on whether it is connected to the PSTN network or not (step 83.) The modem will know whether it is connected to the PSTN via a configuration option which was set at install time. If connected to the PSTN, the modem will transmit a 2100 Hz tone for one second (step 84) then proceed to the ETC2 training sequence (step 85.) If the modem is not connected to the PSTN (step 83), it can proceed directly to the ETC2 training sequence (step 85), avoiding the additional one second of startup shown in step 84.

Figure 7:
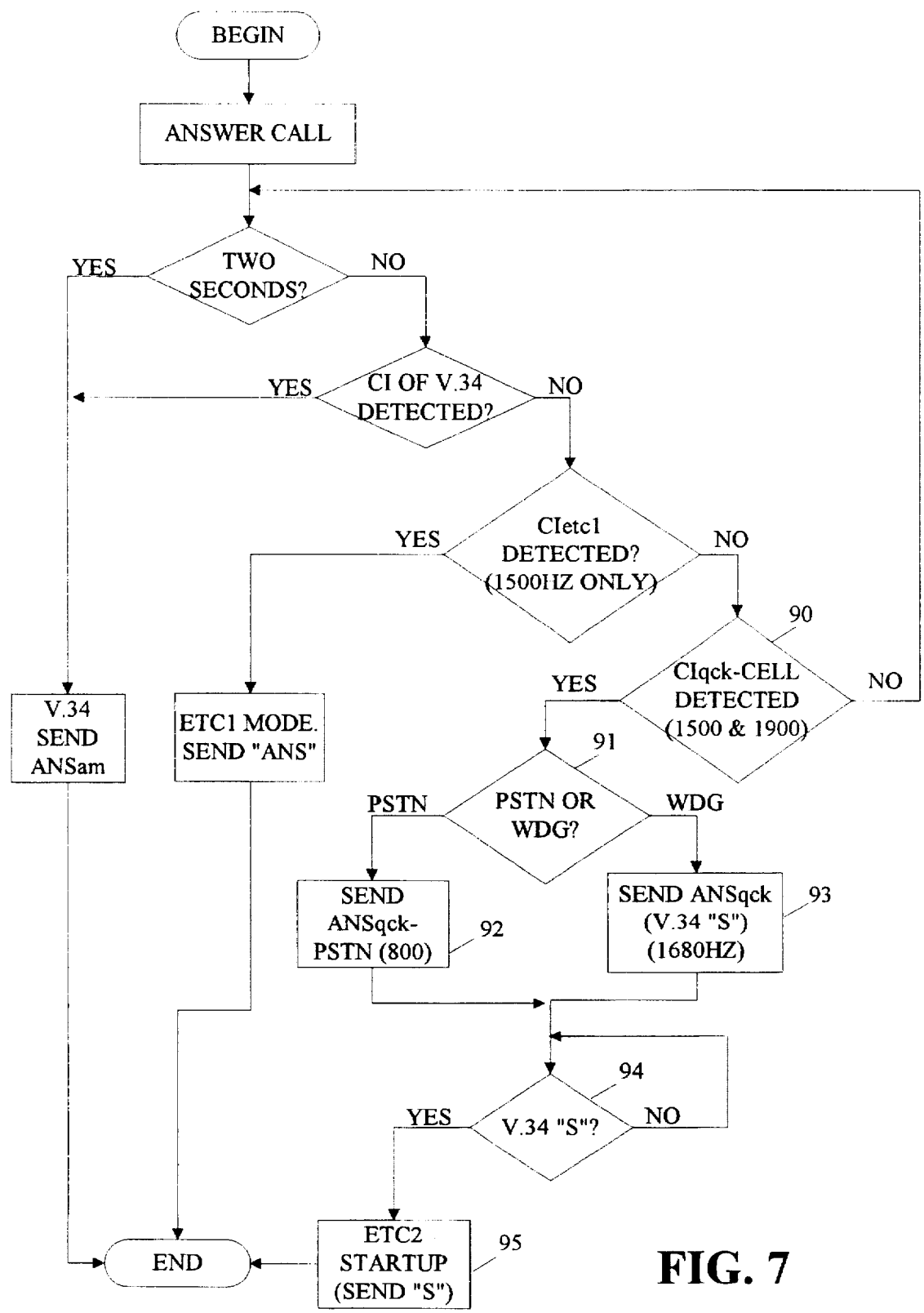
FIG. 7 is a software flowchart illustrating the architecture and operation of the present invention when the answering modem is a central-site modem.

Reference is now made to FIG. 7, which is a software flowchart illustrating the top-level software architecture and operation of a central site answer modem. As illustrated in the flowchart, and in accordance with the presently preferred embodiment, when the answer modem is a central-site modem, it assume that any transmissions made in accordance with the modulation standard with the present invention will be via a communication link with a cellular calling modem. Therefore, step 90 indicates detection the ClQck calling signal in the form of a modulated 1500 and 1900 hz tones, as transmitted by cellular calling modem. If the ClQck calling signal is detected, then the answer modem determines the network configuration at step 91. More specifically, the answer modem determines whether the established communication link passes through a PSTN or not. In the event that the established link does in fact pass through a PSTN, then the answer modem will transmit an 800 hz ANSqck answer signal (step 92). As illustrated in FIG. 4, this instructs the calling modem to transmit the 2100 hz tone. Alternatively, the answer modem will transmit the 1680 hz tone, which instructs the calling modem to proceed directly with the modem start-up and training sequence (step 93). Thereafter, the answer modem will await transmission of the "S" signal in accordance with the V.34 start-up sequence (step 94). Thereafter, the answer modem will respond by transmitting the "S" of the V.34 start-up (step 95). Since the V.34 start-up sequence is well-known in the art, it would not be described herein.

The remainder of the flowchart depicted in FIG. 7 illustrates the central-site answer modem operation and connects sequence in accordance with alternative standards that are well-known in the prior art and need not be discussed herein.

Figure 8:
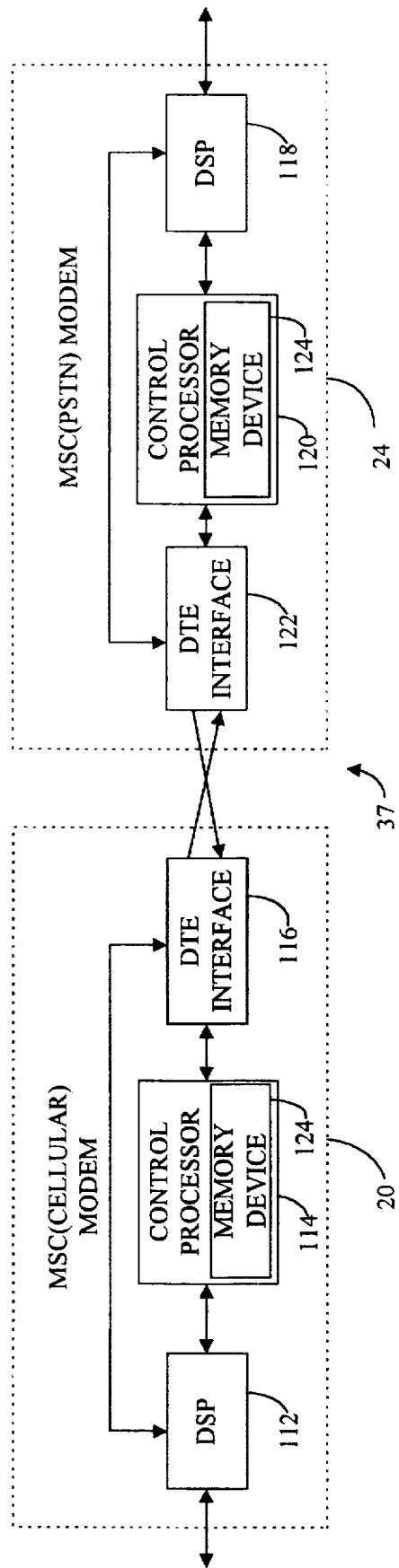
FIG. 8 is a block diagram illustrating the principal internal components of a pair of modems.

Regarding the implementation of the present invention, FIG. 8 generally illustrates the components of MSC (cellular) modem 20 and MSC(PSTN) modem 24. The MSC(cellular) modem 20 comprises a digital signal processor (DSP) 112, a central processor 114, and a DTE interface 116. Likewise, the MSC(PSTN) modem 24 comprises a DSP 118, a control processor 120, and a DTE interface 122. The DTE interface 116 of the MSC(cellular) modem 20 interfaces with the DTE interface 122 of the MSC(PSTN) modem 24 via the connection 37, which can be implemented by any suitable interconnecting device such as, but not limited to, an Electronic Industry Association (EIA) standard RS-232 cross-over or a backplane bus between the modems. As shown in FIG. 8, each modem 20, 24 is configured essentially the same, and thus, they operate in essentially the same manner. However, each modem is provided with operating code which is stored in a memory device 124 provided with the central processor 114, 120, though additional memory can also be provided, if necessary, and connected to the central processor 114, 120 if desired. In the context of the present disclosure, a memory device is a computer readable medium that is embodied in an electronic, magnetic, optical or other physical device or means that can contain or store a computer program, such as the operating code for the modem 20, 24, for use by or in connection with a computer related system or method. The operating code includes control logic that controls, among other things, the type of modulation and error correction techniques utilized which is dependent upon whether the modem is used for cellular or land-line connections. Accordingly, the central processor 114, 120 operates on, or executes, the operating code that is in memory device 124 and configured for implementing the present invention so as to control the operation of modem 36, 38.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for automatically selecting the mode of communication between a plurality of modems comprising:
    a calling modem and an answering modem disposed for intercommunication across an established communication link of a telephone network;
    calling signal means for generating and transmitting a continuous calling signal across the established link;
    answering modem detecting means for detecting the calling signal;
    answering modem analyzing means for analyzing the detected calling signal to determine the configuration of the calling modem;
    answering signal means for generating and transmitting an answering signal across the established link;
    calling modem detecting means for detecting the answering signal;
    calling modem analyzing means for analyzing the detected answering signal to determine the configuration of the answering modem;
    determining means for determining whether the established link passes through a public switched telephone (PSTN); and
    transmitting means responsive to the determining means for transmitting a 2100 hertz tone across the established link only if the established link passes through a PSTN.

2. The system as defined in claim 1, wherein the configuration determined by the answering modem analyzing means includes information relating to the capabilities of the calling modem.

3. The system as defined in claim 1, wherein the configuration determined by the answering modem analyzing means includes information relating to the environment of the calling modem.

4. The system as defined in claim 3, wherein the environment information includes an identification of the type of telephone network that the modem is connected to.

5. The system as defined in claim 1, wherein the continuous calling signal includes frequency components of 1500 hertz and 1900 hertz.

6. The system as defined in claim 1, further including configuration means associated with the calling modem for adjustably defining the configuration of the calling modem.

7. The system as defined in claim 6, wherein the configuration means includes DIP switches.

8. The system as defined in claim 6, wherein the configuration means includes a programmable circuit that is adapted for configuration when the calling modem is installed in the system.

9. The system as defined in claim 1, further including configuration means associated with the answering modem for adjustably defining the configuration of the calling modem.

10. The system as defined in claim 9, wherein the configuration means includes DIP switches.

11. The system as defined in claim 10, wherein the configuration means includes a programmable circuit that is adapted for configuration when the answering modem is installed in the system.

12. The system as defined in claim 1, wherein the calling signal is dependent upon the established link.

13. The system as defined in claim 12, wherein the calling modem includes an adjustable configuration that identifies the established link.

14. In a networked system having an established communication link between multi-mode modems, including a calling modem and an answering modem, a method for automatically establishing the mode of communication between the modems comprising the steps of:
    transmitting a continuous calling signal from the calling modem across the established link, wherein the calling signal includes information relating to the configuration of the calling modem;
    detecting the calling signal at the answering modem;
    analyzing the calling signal to determine the configuration of the calling modem;
    transmitting an answering signal from the answering modem across the established link, wherein the answering signal includes information relating to the configuration of the answering modem;
    detecting the answering signal at the calling modem;

analyzing the answering signal to determine the configuration of the answering modem;

determining whether the established link passes a two-wire connection; and transmitting from the calling modem a 2100 hertz tone across the established link, only if it is determined that the established link passes through a PSTN.

15. The method as defined in claim 14 further including the step of timing the transmission of the 2100 hertz tone.

16. The method as defined in claim 15 further including the step of controlling the transmission of the 2100 hertz tone to maintain the transmission of the 2100 hertz tone until a time that the entire startup sequence takes two seconds.

17. The method as defined in claim 14 wherein the step of transmitting the calling signal includes transmitting a signal comprising 1500 hertz and 1900 hertz frequency components.

18. A multi-mode modem for intercommunication with another multi-mode modem across an established link of a networked system, wherein the multi-mode modems initiate their intercommunication during startup sequence that includes a segment for automatically establishing the communication protocol, the multi-mode modem comprising:

a first signal generator configured to transmit a continuous calling signal across the established link, the calling signal uniquely identifying the configuration of the modem;

a first signal receiver configured to receive and identify valid calling signals transmitted from a remote modem;

a first signal analyzer configured to analyze the received signal to determine the configuration of the remote calling modem;

a second signal generator configured to transmit an answer signal across the established link, the answer signal uniquely identifying the configuration of the modem;

a second signal receiver configured to receive and identify valid answer signals transmitted from a remote modem;

a second signal analyzer configured to analyze the received signal to determine the configuration of the remote answering modem; and means for analyzing the established link and selectively transmitting a 2100 hertz signal to the remote modem only if the established link passes through a PSTN.

19. In a system comprising a multi-mode calling modem disposed for intercommunication with a multi-mode answering modem across an established link of a networked system, wherein the multi-mode modems initiate their intercommunication during startup sequence that includes a segment for automatically establishing the communication protocol, a method for initiating the startup sequence comprising the steps of:

transmitting a unique calling signal from the calling modem that uniquely identifies the configuration of the calling modem;

detecting at the answering modem the unique calling signal;

transmitting a unique answer signal from the answering modem that uniquely identifies the configuration of the answering modem;

detecting at the calling modem the unique answer signal;

determining whether the established link passes through a PSTN; and transmitting a 2100 hertz signal from the calling modem over the established link, only if the link is determined to pass through a PSTN.

20. A computer readable storage medium containing program code for controlling the operation of system for automatically selecting the mode of communication between a plurality of modems comprising:

a calling modem and an answering modem disposed for intercommunication across an established communication link of a telephone network;

calling signal means for generating and transmitting a continuous calling signal across the established link;

answering modem detecting means for detecting the calling signal;

answering modem analyzing means for analyzing the detected calling signal to determine the configuration of the calling modem;

answering signal means for generating and transmitting an answering signal across the established link;

calling modem detecting means for detecting the answering signal;

calling modem analyzing means for analyzing the detected answering signal to determine the configuration of the answering modem;

determining means for determining whether the established link passes through a public switched telephone (PSTN); and transmitting means responsive to the determining means for transmitting a 2100 hertz tone across the established link only if the established link passes through a PSTN.

* * * * *